Patented Aug. 16, 1932

1,871,641

UNITED STATES PATENT OFFICE

HENRY C. P. WEBER, OF EDGEWOOD, PENNSYLVANIA

CONDENSATION PRODUCT

No Drawing.    Application filed February 16, 1927.   Serial No. 168,845.

My invention relates to condensation products, more especially to phenolic condensation products, being directed to the production of a material of this type which will obviate many of the steps previously considered necessary in the making of such condensation products. More particularly, this invention, which is a continuation in part of application No. 412,568, filed September 24, 1920, and which has matured into patent No. 1,630,365, relates to the preparation of a composite material including a carbohydrate, such as cellulose, which may be built up into plates or other suitable forms by molding.

Among objects of my invention is the utilization of ingredients ordinarily used in the making of finished or semi-finished condensation products, in conjunction with cellulose, by impregnating or combining cellulose with the initial ingredients, thus making the cellulose a part of the reacting system during the condensation.

Hitherto, in making a composite material, it was customary to first produce the condensation product in soluble form, the cellulose or other material being then impregnated with the condensation product, either in the fused or in dissolved state, after which the impregnated material was treated with heat, or heat and pressure, to harden the binder.

Such a procedure involved numerous steps, among which was the production of the intermediate condensation product formed by allowing formaldehyde or its equivalent to react upon a phenolic substance under carefully controlled conditions in order that the resulting product might have suitable characteristics for the impregnation of material such as cellulose, which was done at a later stage. Such control required expert attention and closely regulated conditions. Material impregnated with the product was frequently not permeated thereby, but was simply covered with the material. This condition was due largely to the viscosity of the condensation product which prevented deep penetration thereof into the cellulose, forming a composite product which was not uniform throughout.

It has also been proposed to parchmentize or hydrolize cellulose by means of a parchmentizing agent, such as zinc chloride, and, after suitable treatment, to impregnate the material with a phenolic condensation product. This modification has greater disadvantages since it is necessary to first parchmentize the material and then thoroughly wash it to remove all of the parchmentizing agent, after which the water remaining in the fiber is eliminated by washing with alcohol or other organic solvent to remove the water and replace it with the alcohol or other solvent. The material thus treated was then placed in a solution of a phenolic condensation product to allow the product to permeate the material. The successive steps necessitated extra labor and consumed considerable time to become effective.

Such a method of impregnating parchmentized fiber can be but imperfect at best since the material to be impregnated is a colloid if properly parchmentized, and the condensation product is also largely a colloid. It is known, of course, that two such materials do not permeate each other. The product formed thereby is not materially different from that formed by the first named process in that the condensation product does not penetrate appreciably into the cells of the fibers used, but merely coats the surfaces thereof.

The present invention obviates the difficulties encountered in prior methods, producing a composite material by the combination of the primary ingredients which make up the condensation product with the material to be impregnated. I first activate the fiber either by parchmentizing or by treatment with formaldehyde. I generally prefer to parchmentize the fiber, although this step is not, in all cases, necessary.

In case the fiber is activated by parchmentization, the parchmentizing agent is usually allowed to remain in the fiber, after which the fiber is treated with either phenol or formaldehyde to form a compound with the cellulose of the fiber. The material so treated is then impregnated with formaldehyde or phenol, as the case may be, and subjected to heat and pressure to form the condensation product. Various modifications of this procedure may be made, some of which are described hereinbelow.

Many advantages result from proceeding in the manner indicated. By impregnating with the individual ingredients, or a mixture of several ingredients of the final condensation product, deeper penetration of the fiber is obtained, as these constituents are much more mobile than the customary impregnating agents. For instance, phenol or formaldehyde is much less viscous than a phenolic condensation product or a varnish. Furthermore, the presence of water that may remain after parchmentization does not interfere with penetration. Since the cellulosic base which is to be impregnated itself enters into the combination with the impregnating substance, contact is much more intimate and the resulting material is more homogeneous, which results in better electrical properties. The condensation reaction is much more diffuse, allowing better control thereof, avoiding any danger of the reaction becoming violent, a difficulty which was serious in prior methods. I eliminate the use of solvents and of an intermediate phenolic condensation product, thus lowering the cost of the material considerably. My method may be made continuous and involves very little labor and, particularly, avoids the tedious washing operations necessary when a prior process involving parchmentization of the fiber was used.

My new method preferably involves the formation of a reactive or activated cellulose by means of parchmentization, the parchmentizing agent being combined with the cellulose and providing a catalyst for the succeeding condensation reaction. The treatment with either phenol or formaldehyde subsequent to the parchmentization or, in some cases, simultaneously therewith, results in the formation of compounds with the cellulose, a phenol ether probably being formed when phenol is combined therewith, and a formaldehyde addition product in the case of combination with formaldehyde.

One procedure in practicing my invention consists in first parchmentizing or hydrolizing a fiber. This may be accomplished with the use of ordinary parchmentizing agents, such as zinc chloride or sulphuric acid, but I have found that the use of caustic soda, or other alkali, or sodium zincate or a similar salt of an amphoteric metal is preferable. These substances or parchmentizing agents act as catalysts in the condensation reaction. The latter substances are less sensitive to variations in the conditions of the reaction and their use requires less careful control of the factors than does the use of the other parchmentizing agents. When caustic soda is used, especially a 20% solution, considerable shrinkage of the fiber takes place. I have found that such shrinkage can be controlled and practically entirely prevented by the addition of a salt, such as 10 to 15% sodium chloride. Instead of sodium zincate, I may use other salts, such as stannates, stannites, antimonates, aluminates, titanates, and, in general, compounds of amphoteric metals such as dissolve in caustic soda or ammonia.

It is believed that these parchmentizing agents from combinations with the cellulose, leaving the same in a basic condition for the reception of the ingredients of the condensation product. I have found that it is not necessary to remove the excess of parchmentizing agent, although this may be done before further treatment.

The hydrated, parchmentized or activated cellulose material is treated with formaldehyde and then with phenol or its equivalent, after which the condensation product is formed by heat and pressure. If desired, I may simultaneously parchmentize and impregnate with formaldehyde by the use of a solution of formaldehyde and parchmentizing agent, which is followed by a treatment with phenol, and then the condensation product is formed by heat and pressure.

A still further modification lies in forming a mixture of phenol, formaldehyde, and parchmentizing agent, and treating the fiber directly with the mixture, after which the condensation product is formed by heat and pressure.

A practical method of utilization of my invention is as follows:—A sheet of paper, generally in the form of a roll, is continuously passed through a bath of parchmentizing agent, such as a 20% solution of caustic soda containing 10 to 15% sodium chloride, then into a bath of formaldehyde or an equivalent material containing an active methylene group or through a chamber containing vapors of formaldehyde. The sheet of paper so treated is passed through a bath of phenol or equivalent material and then between hot rolls where pressure is applied, forming an intermediate condensation product which is soluble and fusible. At this point, it is sometimes desirable to remove the parchmentizing agent, which is readily done by passing the sheet through water, after which it is dried, generally in a vacuum. The paper thus thoroughly impregnated with an intermediate condensation product may then be either rolled for shipment or cut up directly into desired form, for instance, discs, a number of which may be assembled and subjected to further heat and pressure to compact the material and harden the condensation product.

The initial parchmentization not only activates the cellulose and makes it more reactive but it also toughens the fiber, making a stronger structure. Cellulose thus treated holds formaldehyde and phenol with relatively great tenacity and allows the same to penetrate deeply into the cells of the fiber. Activation of the cellulose results in an intimate relationship of the formaldehyde and phenolic ingredients with the cellulose, forming a uniform and homogeneous product.

Control of a system of this type is very simple, the amount of impregnation of the fiber may be very accurately determined in advance and may be varied between wide limits at will, I have produced condensation products containing from 102 to over 300% of the original weight of the cellulose.

My method is extremely simple as it consists of but few easily controlled steps, requiring very little manipulation. The various steps of my process are less sensitive to changes in conditions and the process requires less experienced operators than prior methods. The degree of impregnation may be very easily controlled and inexpensive ingredients may be used, thereby enabling a wide variety of products to be formed by my method at small expense.

Although I have described my invention with the use of phenol and formaldehyde and paper, it is to be understood that my invention is not limited to the use of these ingredients specifically, since it is obvious that various equivalent materials may be used in place thereof. For instance, cresol or various homologues of the phenolic type may be used in place of phenol and the formaldehyde may be replaced by trioxymethylene, hexamethylene tetramine furfural, or other substances having an active methylene or fural group. My invention is not confined to the use of cellulose but other carbohydrates, such as sugar and starch, may be substituted therefor. It is to be understood that, by the use of the terms "phenol", "formaldehyde" and "cellulose", I do not confine myself to the specific materials described in connection with my method but include all reasonable equivalents thereof. The term "hydrated" as applied to cellulose is intended to include "parchmentized", "hydrolized" and "vulcanized" material and is not limited to a cellulose which contains additional elements of water.

I claim as my invention:

1. The method of forming a condensation product which comprises treating cellulose with a parchmentizing agent capable of activating the cellulose without dissolving it, treating the undissolved activated cellulose with formaldehyde and then treating the mixture with phenol to form resinous material.

2. The method of forming a condensation product which comprises treating cellulose with a hydrating parchmentizing agent capable of activating the cellulose without dissolving it, adding formaldehyde to the undissolved hydrated cellulose and then treating the mixture with phenol to form resinous material.

3. The method of forming a condensation product which comprises treating cellulose with a hydrating agent capable of hydrating the cellulose without dissolving it, adding formaldehyde to the undissolved hydrated material and then treating the mixture with phenol to form resinous material.

4. The method of forming a condensation product which comprises simultaneously treating cellulose with formaldehyde and an alkaline parchmentizing agent capable of parchmentizing the cellulose without dissolving it, said parchmentizing agent having the property of condensing mixtures of phenol and formaldehyde, and then treating with a phenol to form a resinous material.

5. The method of forming a condensation product which comprises simultaneously treating cellulose with formaldehyde and an alkaline salt capable of parchmentizing cellulose, and then treating with phenol to form a resinous material.

6. The method of forming a condensation product which comprises simultaneously treating cellulose with an alkaline salt of an amphoteric metal and formaldehyde and then treating with phenol.

7. A condensation product formed by successively treating hydrated cellulose with formaldehyde and then with a phenol.

8. The method of forming a condensation product which consists in simultaneously treating cellulose with sodium zincate and formaldehyde, and then treating with a phenol to form a phenolic substance.

9. The method of forming a condensation product which consists in combining hydrated cellulose with a methylane containing substance capable of being condensed with phenol, and then treating with a phenol to form a resinous product.

10. The method of forming a condensation product which consists in simultaneously treating cellulose with a substance capable of being condensed with said cellulose and with phenolic bodies, and with an alkaline parchmentizer capable of acting as a condensing agent for mixtures of phenolic bodies and bodies containing active methylene group, and then treating with a phenol to form resinous material.

11. The method of forming a condensation product which comprises treating cellulose with a hydrating agent, adding formaldehyde to the hydrated cellulose to form a formaldehyde addition product and then treating the formaldehyde addition product with phenol to form a resinous material.

12. A condensation product resulting from the reaction of a formaldehyde addition product of hydrated cellulose and a phenol.

13. The method of forming a condensation product which comprises simultaneously treating cellulose with formaldehyde and a hydrating agent, thereby forming a formaldehyde addition compound of cellulose and then treating the resulting product with a phenol to form a resinous material.

In testimony whereof, I have hereunto subscribed my name this 10th day of February, 1927.

HENRY C. P. WEBER.